(12) United States Patent
Kong et al.

(10) Patent No.: US 11,577,664 B2
(45) Date of Patent: Feb. 14, 2023

(54) POP-UP APPARATUS FOR CAMERA MIRROR SYSTEM DISPOSED INSIDE PANEL OF VEHICLE

(71) Applicants: Hyundai Motor Company, Seoul (KR); Kia Motors Corporation, Seoul (KR)

(72) Inventors: Nak Kyoung Kong, Gyeonggi-do (KR); Seung Hyeok Chang, Gyeonggi-do (KR); Hyeon Jo, Gyeonggi-do (KR); Ki Hong Lee, Seoul (KR); Jong Min Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 615 days.

(21) Appl. No.: 16/683,346

(22) Filed: Nov. 14, 2019

(65) Prior Publication Data
US 2020/0353877 A1    Nov. 12, 2020

(30) Foreign Application Priority Data
May 8, 2019 (KR) .......................... 10-2019-0053719

(51) Int. Cl.
*H04N 7/18* (2006.01)
*B60R 11/04* (2006.01)
*E05F 15/603* (2015.01)
*H04N 5/225* (2006.01)
(Continued)

(52) U.S. Cl.
CPC ............ *B60R 11/04* (2013.01); *E05F 15/603* (2015.01); *H04N 5/2253* (2013.01); *H04N 5/2254* (2013.01); *H04N 5/232* (2013.01); *B60R 2011/004* (2013.01); *B60R 2011/0043* (2013.01); *B60R 2011/0092* (2013.01); *B60R 2300/8046* (2013.01);
(Continued)

(58) Field of Classification Search
CPC ....................................................... B60R 11/04
USPC .......................................................... 359/841
See application file for complete search history.

(56) References Cited

U.S. PATENT DOCUMENTS

| 5,121,200 A * | 6/1992 | Choi ......................... B60R 1/00 396/419 |
| 6,975,347 B1 * | 12/2005 | Strumolo .................. B60R 1/00 348/148 |
| 10,682,965 B2 * | 6/2020 | Oba ........................ G06V 20/58 |

(Continued)

FOREIGN PATENT DOCUMENTS

| DE | 102013001721 A1 | 8/2014 |
| EP | 3248842 A1 | 11/2017 |

(Continued)

*Primary Examiner* — Leron Beck
(74) *Attorney, Agent, or Firm* — Fox Rothschild LLP (57) ABSTRACT

A pop-up apparatus for a camera mirror system disposed inside a panel of a body of a vehicle includes a camera mirror assembly to provide a rear view of a vehicle, a camera mirror housing disposed to enclose the camera mirror system and configured to move to an outside of the panel, and a camera mirror frame configured to receive a driving force from a driving unit. The driving unit opens a cover of the panel while driving the camera mirror assembly to move to the outside of the panel through an opened portion of the panel in linkage with the camera mirror frame.

8 Claims, 6 Drawing Sheets

(51) Int. Cl.
  *H04N 5/232* (2006.01)
  *B60R 11/00* (2006.01)
(52) U.S. Cl.
  CPC ... *E05Y 2201/716* (2013.01); *E05Y 2201/722* (2013.01); *E05Y 2900/53* (2013.01)

(56) References Cited

U.S. PATENT DOCUMENTS

| | | | | |
|---|---|---|---|---|
| 10,785,353 | B1* | 9/2020 | Li | H04M 1/0264 |
| 2003/0103142 | A1* | 6/2003 | Hitomi | B60R 11/04 |
| | | | | 348/148 |
| 2003/0202097 | A1* | 10/2003 | Kallhammer | B60R 11/04 |
| | | | | 348/148 |
| 2004/0130622 | A1* | 7/2004 | Lang | B60R 11/04 |
| | | | | 348/148 |
| 2004/0196368 | A1* | 10/2004 | Asai | B60R 1/00 |
| | | | | 348/148 |
| 2006/0171704 | A1* | 8/2006 | Bingle | B60R 11/04 |
| | | | | 396/419 |
| 2009/0231430 | A1* | 9/2009 | Buschmann | B60Q 1/0023 |
| | | | | 348/148 |
| 2013/0033604 | A1* | 2/2013 | Ohshima | B60R 11/04 |
| | | | | 348/148 |
| 2016/0250972 | A1* | 9/2016 | Kuester | B60R 1/04 |
| | | | | 348/148 |
| 2017/0136962 | A1* | 5/2017 | Morita | H04N 13/296 |

FOREIGN PATENT DOCUMENTS

| | | |
|---|---|---|
| KR | 20070063485 A | 6/2007 |
| WO | 2017048126 A1 | 3/2017 |

* cited by examiner

POP-UP APPARATUS FOR CAMERA MIRROR SYSTEM DISPOSED INSIDE PANEL OF VEHICLE

CROSS-REFERENCE TO RELATED APPLICATION

This application claims under 35 U.S.C. § 119(a) the benefit of Korean Patent Application No. 10-2019-0053719 filed on May 8, 2019, the entire contents of which are incorporated herein by reference.

BACKGROUND

(a) Technical Field

The present disclosure relates to a pop-up apparatus for a camera mirror system disposed at a panel of a vehicle body, more particularly, to the pop-up apparatus capable of achieving protrusion of a camera mirror assembly disposed inside a panel of a vehicle and configured to protrude to outside of the panel at a user's request while achieving opening/closing of the panel using a single driving unit.

(b) Description of the Related Art

Generally, a driver of a vehicle performs lane changes while viewing a rearview mirror centrally installed at a front portion of a passenger compartment and side mirrors. When the driver performs a lane change while observing a side mirror disposed toward a target lane, there may be a problem in that the vehicle may strike a vehicle traveling in a blind spot or a vehicle traveling in front.

Meanwhile, in conventional cases, side mirrors, which are installed on a vehicle to protrude outside the vehicle, are configured to be folded in a state in which the vehicle is parked or the vehicle's engine is stopped. As such, side mirrors may be damaged by physical impact during folding thereof.

Recent developments in this field include a camera mirror system (CMS), which is configured to display, on a screen, an external situation around the vehicle photographed by an external camera lens.

In a vehicle equipped with such a CMS system, an external situation around the vehicle is photographed by an external camera installed so as to protrude outside the vehicle, and an image representing the photographed external situation is displayed on a display disposed in a passenger compartment.

Figure 1:
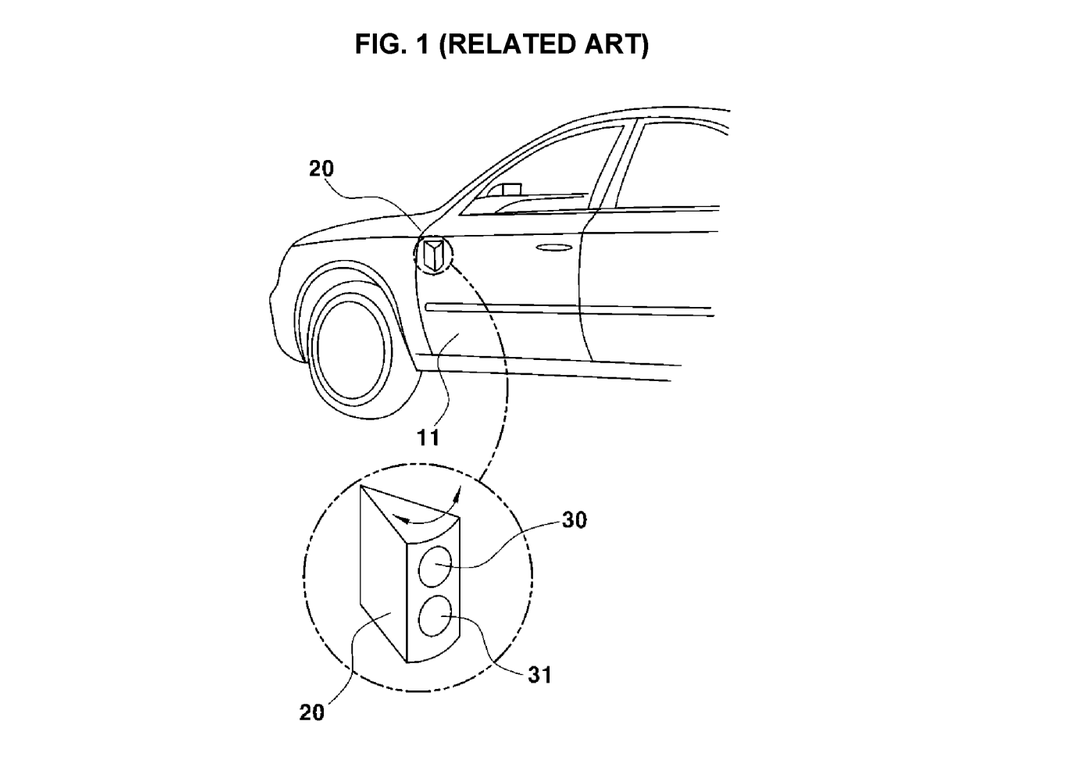
FIG. 1 (RELATED ART) is a view illustrating a configuration of an external camera protruding from an outer side surface of a vehicle through rotation thereof in a conventional case.

FIG. 1 (RELATED ART) shows a configuration of an external camera protruding from an outer side surface of a vehicle through rotation thereof in a conventional case.

As shown in FIG. 1, the vehicle includes an external camera 20 disposed at one side of a door 11. The external camera 20 is configured to rotate toward an inside of the door 11, and includes a first lens 30 and a second lens 31.

The external camera 20 is configured to be inserted into the door 11 in an unused state. In the unused state, however, the external camera 20 is still maintained in a state of being exposed to the outside of the door 11 without being completely inserted into the door 11. For this reason, there may be a danger of damage or theft/vandalism.

Meanwhile, in the case of an external camera installed at a door and configured to be retracted in a folding manner, the protrusion length of the external camera is limited, and as such, there may be a problem in that it is difficult to secure side and rear views.

The above information disclosed in this Background section is only for enhancement of understanding of the background of the invention and therefore it may contain information that does not form the prior art that is already known in this country to a person of ordinary skill in the art.

SUMMARY

The present disclosure relates to a pop-up apparatus including a camera mirror assembly disposed inside a panel of a vehicle and configured to selectively protrude a camera mirror system to outside of the panel at a user's request.

The present disclosure also relates to a pop-up apparatus for opening/closing an opening disposed at a panel of a vehicle body in linkage with protrusion of a camera mirror system through the opening.

In one aspect, the present invention provides a pop-up apparatus for a camera mirror system disposed inside a panel of a body of a vehicle, the pop-up apparatus including a camera mirror assembly including the camera mirror system, which provides a rear view of a vehicle, a camera mirror housing disposed to enclose the camera mirror system and configured to move to an outside of the panel, and a camera mirror frame configured to receive a driving force from a driving unit, and the driving unit, which opens a cover of the panel while driving the camera mirror assembly to move to the outside of the panel through an opened portion of the panel in linkage with the camera mirror frame.

In a preferred embodiment, the driving unit may include a driving gear configured to receive the driving force from a driver, a rotating gear connected to one end of the camera mirror frame to rotate along an outer circumferential surface of the driving gear, and a rack gear configured to be engaged at a first end thereof with the driving gear such that the rack gear is movable in a width direction of the vehicle, the rack gear being operatively connectable at a second end thereof to the cover of the panel.

In another preferred embodiment, the driving unit may further include a pinion gear connected to the cover at an inside of the cover, the pinion gear being engageable with the rack gear, to rotate the cover at an inside of the panel in linkage with the rack gear.

In still another preferred embodiment, the driving gear may have a fixed central axis, and the rotating gear may be engaged with the driving gear such that the rotating gear rotates along the outer circumferential surface of the driving gear. The camera mirror assembly may protrude to the outside of the panel when the rotating gear is disposed at a position on the driving gear near the panel.

In yet another preferred embodiment, the driving gear may have a fixed central axis, and the rotating gear may be engaged with the driving gear such that the rotating gear rotates along the outer circumferential surface of the driving gear. The camera mirror assembly may be retracted into the inside of the panel when the rotating gear is disposed at a position on the driving gear far from the panel.

In still yet another preferred embodiment, the pop-up apparatus for the camera mirror system may further include a driving unit housing configured to enclose the driving unit.

In still yet another preferred embodiment, the rotating gear may be provided with a protrusion configured to move along a guide provided at the driving unit housing.

In still yet another preferred embodiment, the driving gear may include two gear plates respectively configured to be engageable with the pinion gear and the rotating gear.

In still yet another preferred embodiment, the camera mirror frame may be fixed to a central shaft of the rotating gear, to move the camera mirror assembly in a longitudinal direction of the camera mirror frame.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present invention, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art.

The use of the ordinal adjectives "first", "second", etc., to describe a common element, merely indicate that different instances of like elements are being referred to, and are not intended to imply that the elements so described must be in a given sequence.

The present disclosure relates to a camera mirror system 110, more particularly, to a pop-up apparatus including a camera mirror assembly 100 disposed inside a panel 300 of a vehicle body while including the camera mirror system 110. The pop-up apparatus is disposed inside the panel 300 and applies a driving force to the camera mirror assembly 100 in order to force the camera mirror assembly 100 to protrude outwards of the panel 300 at a user's request.

The camera mirror system 110 of the present invention includes a camera. The camera is configured to photograph lateral and rear sides of a vehicle upon receiving a request from a user. The camera mirror system 110 transmits a photographed image to a display (not shown) disposed in a passenger compartment. Accordingly, it may be possible to display images of the lateral and rear sides of the vehicle in order to enable the user to view the displayed image in the passenger compartment without providing a separate mirror unit.

The display of the present invention may be configured to be disposed at each of left and right sides of the vehicle. In this case, left and right displays may be provided, and a left camera and a right camera, which are connected to respective displays, may also be provided.

The camera mirror system 110 of the present invention conceptually includes left and right cameras as described above. In this case, the camera mirror system 110 may be configured to be symmetrical with the left and right sides of the vehicle.

Meanwhile, the panel 300 of the present invention may be defined in conjunction with abody of the vehicle. In an embodiment of the present invention, the camera mirror assembly 100 is disposed at a front fender panel of the vehicle. Of course, the position of the panel 300 where the camera mirror assembly 100 is disposed is not limited to the above-described position.

The embodiment of the present invention will be described in conjunction with the configuration of the camera mirror assembly 100 disposed at the left side of the vehicle and the fender panel as the panel 300.

Figure 2:
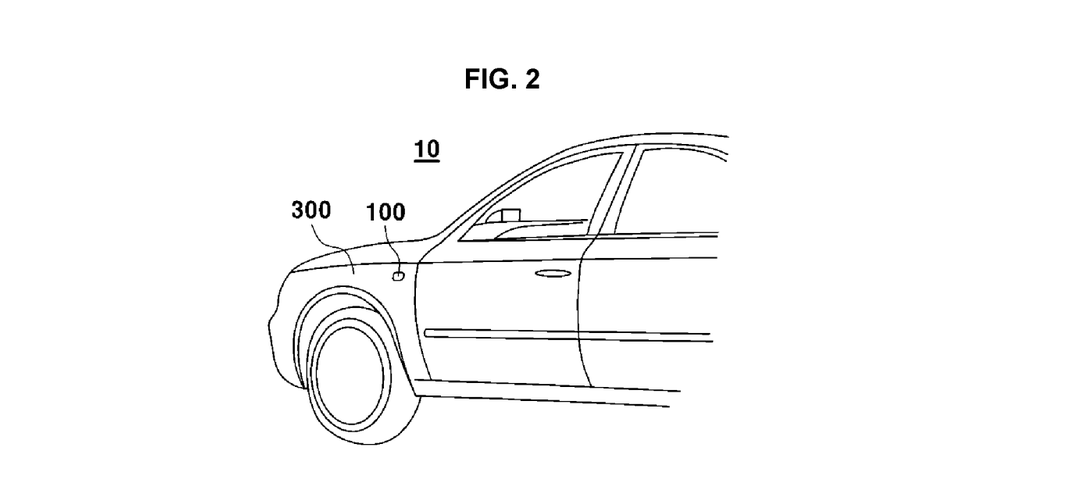
FIG. 2 is a view of a configuration of a pop-up apparatus for a camera mirror system disposed inside a panel of a vehicle body in a vehicle in accordance with an embodiment of the present invention, illustrating a state in which a camera mirror assembly is retracted.
Figure 3:
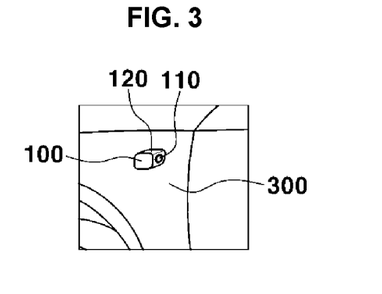
FIG. 3 is a view of the configuration of the pop-up apparatus according to the illustrated embodiment of the present invention, illustrating a state in which the camera mirror assembly protrudes.

FIGS. 2 and 3 illustrate camera mirror assemblies 100 disposed at the front fender panel 300 in accordance with an embodiment of the present invention.

As illustrated in FIGS. 2 and 3, the camera mirror assemblies 100 are disposed at left and right sides of the front fender panel 300, respectively. Each camera mirror assembly 100 is configured such that at least a portion of the camera mirror assembly 100 protrudes outwards of the fender panel 300 at the request of the user or upon engine start of the vehicle.

As illustrated in FIG. 2, the camera mirror assembly 100 is retracted into the inside of the fender panel 300 of the vehicle upon engine stop of the vehicle or at the request of the user (when it is requested to stop running of the vehicle) such that the camera mirror assembly 100 is hidden by a cover 310 of the fender panel 300 to be prevented from being exposed to the outside of the fender panel 300.

Of course, the camera mirror assembly 100 is configured such that at least a portion of the camera mirror assembly 100 disposed at the inside of the fender panel 300 protrudes outwards of the fender panel 300 when the engine of the vehicle starts or a request for running of the vehicle (accelerator opening, etc.) is made.

FIG. 3 illustrates a configuration of the camera mirror assembly 100 to protrude outwards. The protrusion amount of the camera mirror assembly 100 may be determined in accordance with the speed of the vehicle or the width of a side-rear image requested by the user.

In a preferred embodiment of the present invention, the protrusion amount of the camera mirror assembly 100 may be determined in accordance with a position where a camera mirror frame 130 is connected to a rotating gear 220. When the camera mirror frame 130, which is included in the camera mirror assembly 100, is disposed at an eccentric shaft of the rotating gear 220, the protrusion amount of the camera mirror assembly 100 may be determined in accordance with a position of the rotating gear 220.

In particular, the protrusion amount of the camera mirror assembly 100 may be selectively determined in accordance with a position of the rotating gear 220 on an outer circumferential surface of a driving gear 210, and as such, an image photographed by the camera mirror system 110 may be selectively varied.

Further, the protrusion amount of the camera mirror system 110 may be automatically set in linkage with the speed of the vehicle by a control unit.

The camera mirror assembly 100 may be configured to protrude outwards of the panel 300 upon engine start of the vehicle or when an accelerator pedal input from the user is applied.

Figure 4:
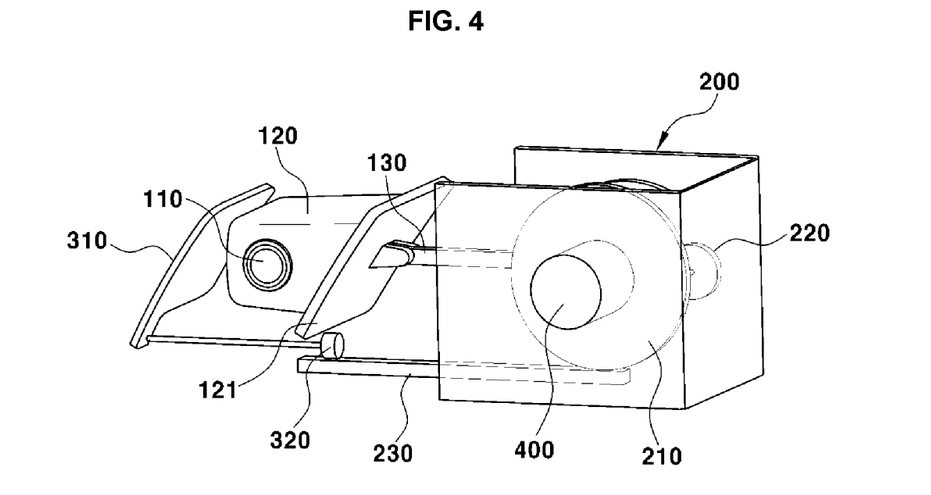
FIG. 4 is a view illustrating coupling of the camera mirror assembly to a driving unitin the pop-up apparatus according to the illustrated embodiment of the present invention.

FIG. 4 illustrates coupling of the camera mirror assembly 100 to a driving unit 200. The camera mirror assembly 100 includes the camera mirror system 110, which is disposed inside the cover 310 of the panel 300, a camera mirror housing 120 configured to enclose the camera mirror system 110, and the camera mirror frame 130, which is connected to an inner end of the camera mirror housing 120.

The driving unit 200, which is also included in the camera mirror assembly 100, applies a driving force to the camera mirror assembly 100, thereby causing the camera mirror housing 120 to protrude partially outwards of the panel 300. The driving unit 200 includes a driver installed in the vehicle and configured to apply a driving force, the driving gear 210, which is coupled to the driver, to apply a driving force from the driver in one direction or in a rotation direction, and the rotating gear 220 coupled to the camera mirror frame 130 and engaged with the driving gear 210, to move along the driving gear 210. The central axis of the driving gear 210 is fixed.

The driving gear 210 applies a driving force to move the camera mirror assembly 100 in a width direction of the vehicle. The driving gear 210 is configured to have a structure including at least two plates. In an embodiment of the present invention, the driving gear 210 includes a first driving plate 210a and a second driving plate 210b. The rotating gear 220 is engaged with the first driving plate 210a, to move along an outer circumferential surface of the first driving plate 210a while rotating with respect to the first driving plate 210a. A rack gear 230 is engaged with the second driving plate 210b, to move in a width direction of the vehicle. The rack gear 230 is also operatively connectable to the cover 310 in order to open or close the cover 310. In particular, the rack gear 230 is engageable with a gear disposed inside the cover 310, to open or close the cover 310.

In a preferred embodiment of the present invention, a pinion gear 320 is mounted to one end of the cover 310 inside the cover 310 in order to rotate the cover 310 when the rack gear 230 disposed at a lower end of a housing of the driving unit 200 moves in a width direction of the vehicle.

The camera mirror assembly 100 is configured to be connected to the rotating gear 220. The camera mirror frame 130 is coupled, at one end thereof, to the camera mirror housing 120 in such a manner that freedom of rotation is provided therebetween. The camera mirror frame 130 is also coupled, at the other end thereof, to the rotating gear 220 in such a manner that freedom of rotation is provided therebetween. Accordingly, when the rotating gear 220 moves along the outer circumferential surface of the driving gear 210, the camera mirror housing 120 is moved by a distance corresponding to a horizontal movement distance of the rotating gear 220.

That is, the rotating gear 220 is configured to be engaged with the outer circumferential surface of the first driving plate 210a. When the rotating gear 220 moves while rotating, the camera mirror frame 130 is horizontally moved in a width direction of the vehicle, and as such, the camera mirror assembly 100 is moved in the width direction of the vehicle.

In addition, the rotating gear 220 is configured to face the first driving plate 210a, and as such, does not interfere with the rack gear 230, which is configured to move horizontally while facing the second driving plate 210b spaced apart from the first driving plate 210a in a longitudinal direction of the vehicle.

Figure 5A:
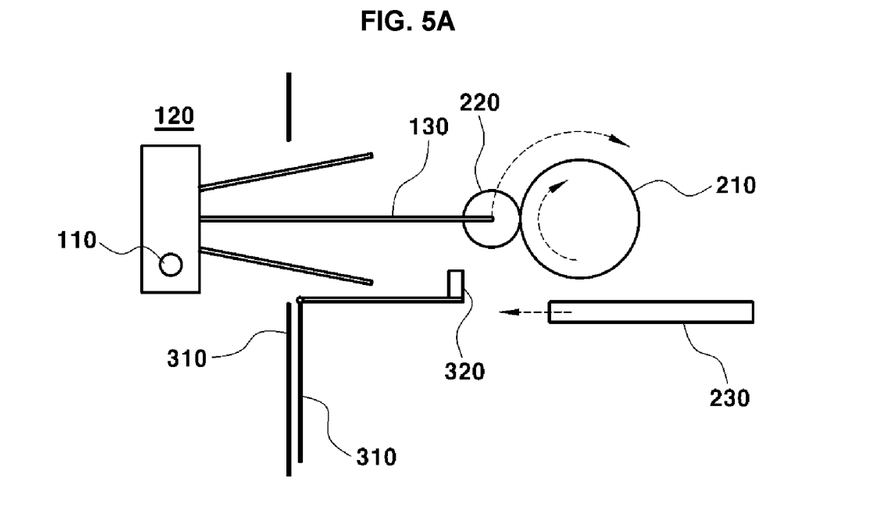
FIG. 5A is a view illustrating operation of the camera mirror assembly protruding to the outside of the vehicle in the pop-up apparatus according to the illustrated embodiment of the present invention.

FIG. 5A shows a lateral sectional view illustrating movement relationship between the camera mirror assembly 100 and the driving unit 200 disposed inside the vehicle.

As illustrated in FIG. 5A, the camera mirror frame 130 is coupled to the driving unit 200. FIG. 5A shows a state in which the camera mirror system 110 protrudes outwards of the panel 300 of the vehicle.

In particular, the camera mirror frame 130 is coupled to the rotating gear 220 in such a manner that the camera mirror frame 130 is aligned with a central shaft of the rotating gear 220. The rotating gear 220 is engaged with the outer circumferential surface of the driving gear 210 to move in the same direction as the rotation direction of the driving gear while being in contact with the outer circumferential surface of the driving gear 210.

In a preferred embodiment of the present invention, the rotating gear 220 is coupled to at least one of plural plates constituting the driving gear 210. In this case, the rack gear 230 is engaged with another plate of the driving gear 210, and as such, is horizontally moved in a width direction of the vehicle, simultaneously with rotation of the rotating gear 220.

As illustrated in FIG. 5A, when the driving gear 2210 rotates clockwise, the rack gear 230 is horizontally moved in a width direction of the vehicle in accordance with application of a rotating force of the driving gear 210 thereto. In this case, the central shaft of the rotating gear 220 rotates clockwise along the outer circumferential surface of the driving gear 210.

In addition, the central shaft of the rotating gear 220 moves in a direction away from the panel 300 when viewed in a width direction of the vehicle. In this case, the camera mirror frame 130 coupled to the rotating gear 220 is moved in the direction away from the panel 300, together with the rotating gear 220, and as such, the camera mirror assembly 100 is moved inwards of the panel 300 through the opening of the panel 300.

When the camera mirror housing 120 is moved inwards of the panel 300, as illustrated in FIG. 5A, the rack gear 230 is moved inside the panel 300 in a direction toward the panel 300.

Figure 5B:
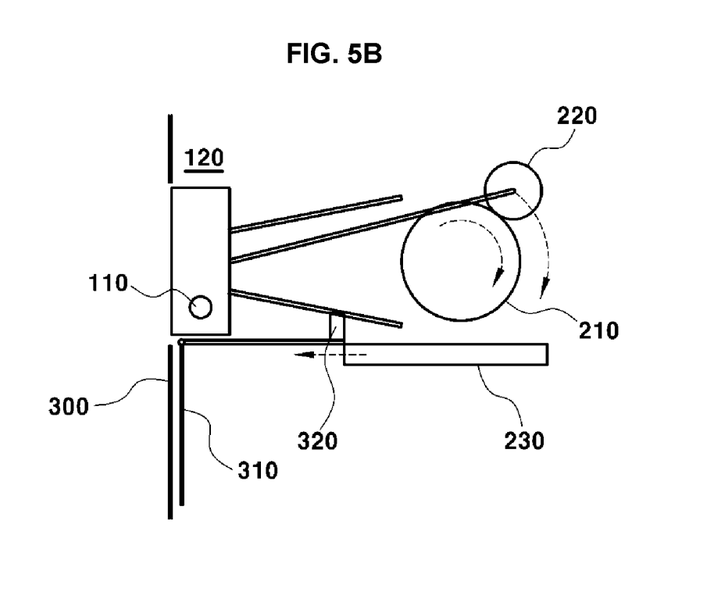
FIG. 5B is a view illustrating operation of the camera mirror assembly retracted into the inside of the vehicle in the pop-up apparatus according to the illustrated embodiment of the present invention.

FIG. 5B shows a movement relationship between the camera mirror assembly 100 and the driving unit 200 at a time when the camera mirror assembly 100 is retracted into the inside of the panel 300.

When the rotating gear 220 moves along the outer circumferential surface of the driving gear 210 in a direction away from the panel 300 in accordance with continued rotation of the driving gear 210 in the clockwise direction, the camera mirror assembly 100 connected to the rotating gear 220 via the camera mirror frame 130 is retracted into the inside of the panel 300.

In a state in which the camera mirror assembly 100 is retracted into the inside of the panel 300, the rack gear 230 disposed beneath the driving gear 210 is engaged with the pinion gear 320 connected to a rear surface of the cover 310. The cover 310 is rotated in the same direction as the rotation direction of the pinion gear 320 in accordance with rotation of the pinion gear 320.

The rear surface of the cover 310 in the panel 300 is connected to the pinion gear 320 by a rod such that the cover 310 rotates in the same direction as the rotation direction of the pinion gear 320. When the rack gear 230 moves horizontally in a direction toward the inner surface of the panel 300, the pinion gear 320 rotates to rotate the cover 310 to a position where the cover 310 covers the opening of the panel 300.

Figure 5C:
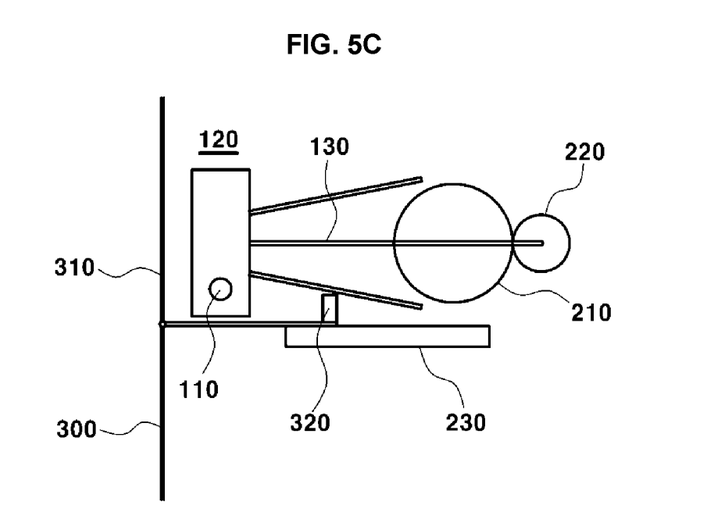
FIG. 5C is a view illustrating a state in which the camera mirror assembly is retracted into the inside of the vehicle, and a cover is closed in the pop-up apparatus according to the illustrated embodiment of the present invention.

In an embodiment of the present invention illustrated in FIG. 5C, the pinion gear 320 may be disposed to rotate the cover 310 in the longitudinal direction of the vehicle such that the cover 310 covers the opening of the panel 300 when the rack gear 230 moves in a direction toward the inner surface of the panel 300.

That is, the camera mirror assembly 100 is configured to be retracted into the inside of the panel 300 at the request of the user or in accordance with a running condition of the vehicle. The cover 310 of the panel 300 is also configured to rotate in accordance with operation of the driving unit to supply a driving force for retraction of the camera mirror assembly 100.

In a preferred embodiment of the present invention, the cover 310 of the panel 300 is configured to rotate after retraction of the camera mirror assembly 100 into the inside of the panel 300 through the opening. In this case, the movement distance of the rack gear 230 until the rack gear 230 is engaged with the pinion gear 320 may be set in order to prevent interference between the camera mirror assembly 100 and the cover 310.

Figure 5D:
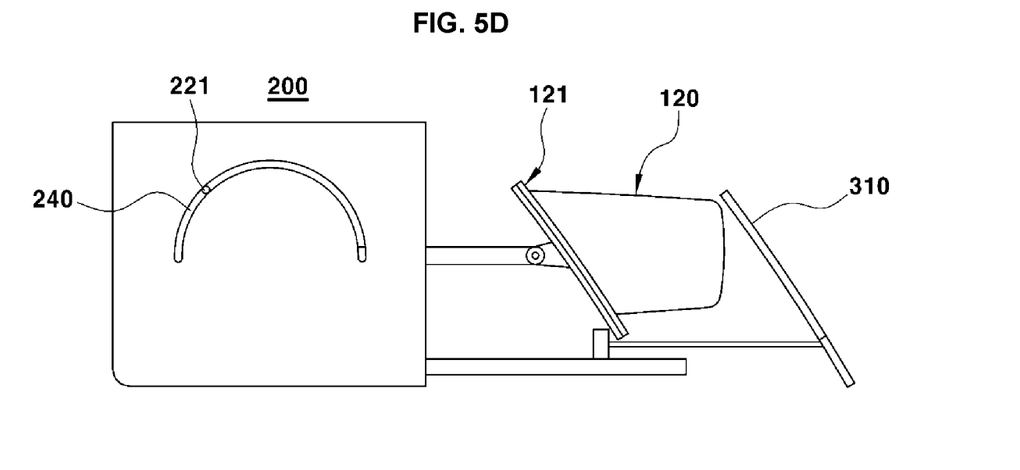
FIG. 5D is a view illustrating a state in which the camera mirror assembly is retracted into the inside of the vehicle, and the cover is closed in the pop-up apparatus according to the illustrated embodiment of the present invention.

FIG. 5D shows a schematic sectional view of a configuration according to an embodiment of the present invention. FIG. 5D illustrates a state in which the cover 310 is closed in accordance with movement of the rotating gear 220 along the driving gear 210 in a direction away from the inner surface of the panel 300.

In this case, the driving unit 200 includes a guide 240 formed at at least one surface of the housing of the driving unit 200 to guide the rotating gear 220 to move along the outer circumferential surface of the driving gear 210. A protrusion 221 is provided at the central shaft of the rotating gear 220. The protrusion 221 is inserted into the guide 240 such that the protrusion 221 moves along the guide 240 during movement of the rotating gear 220 along the outer circumferential surface of the driving gear 210, and as such, movement of the rotating gear 220 is guided.

In a preferred embodiment of the present invention, guides 240 may be provided at opposite sides of the first driving plate 210a. In this case, protrusions 221 are provided at opposite ends of the central shaft of the rotating gear 220, respectively, such that the protrusions 221 are inserted into the guides 240, respectively.

Figure 6A:
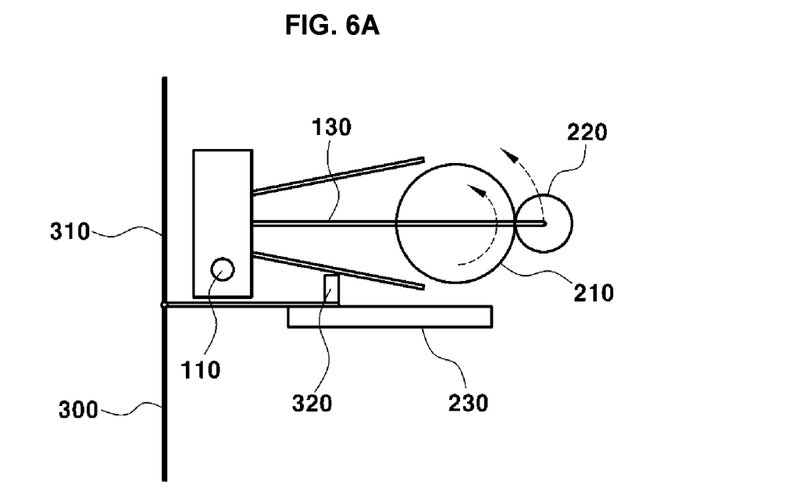
FIG. 6A is a view illustrating operation of the camera mirror assembly to protrude from the inside of the vehicle to the outside of the vehicle in the pop-up apparatus according to the illustrated embodiment of the present invention.
Figure 6B:
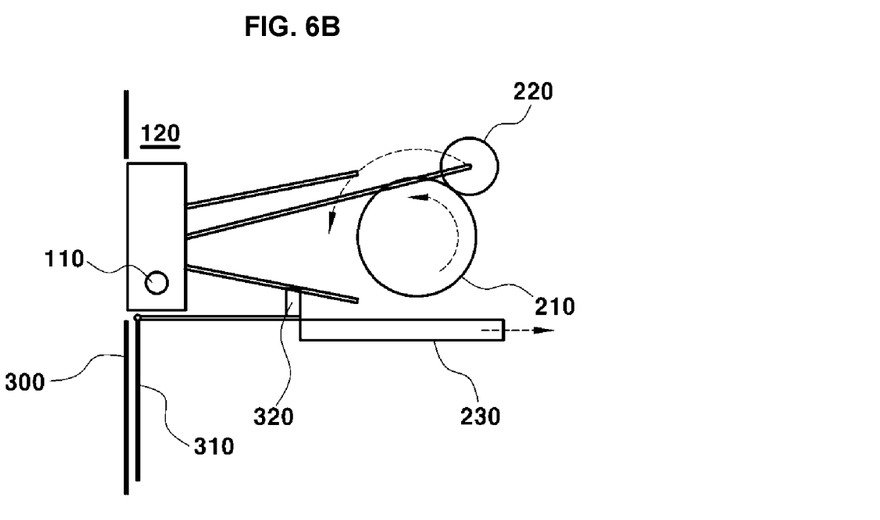
FIG. 6B is a view illustrating operation of the camera mirror assembly protruding to the outside of the vehicle in the pop-up apparatus according to the illustrated embodiment of the present invention.

FIGS. 6A and 6B illustrate a driving relationship between the camera mirror assembly 100 and the panel 300 according to an embodiment of the present invention in which the camera mirror assembly 100 retracted into the inside of the panel 300 is driven to protrude outwards of the panel 300.

As illustrated in FIG. 6A, the camera mirror assembly 100, which is disposed inside the panel 300, is moved to protrude outwards of the panel 300 at the request of the user or in accordance with a running environment of the vehicle. A driving force from the driver is applied to the driving unit 200. In accordance with the applied driving force, the driving unit 200 moves at least a portion of the housing 120 to the outside of the panel 300.

That is, the driving gear 210 rotates in a direction reverse to that of FIGS. 5A and 5B (clockwise), to perform protrusion of the camera mirror assembly 100. The rotating gear 200, which is configured to rotate along the outer circumferential surface of the driving gear 210, moves in a direction toward the inner surface of the panel 300. As a result, the camera mirror frame 130 coupled to the rotating gear 220 is moved.

Further, the rack gear 230, which is configured to be engaged with the driving gear 210 via the driving plate different from the driving plate associated with the rotating gear 220, is horizontally moved in a direction away from the inner surface of the panel 300. As a result, the cover 310 of the panel 300 is rotated by the pinion gear 320 integrated with the cover 310 in accordance with rotation of the pinion gear 320 engaged with the rack gear 230, and as such, the cover 310 is opened.

In a preferred embodiment of the present invention, a driving relationship among the driving gear 210, the rotating gear 220 and the rack gear 230 may be set such that the rack gear 230 moves to preferentially open the cover 310 of the panel 300, and the camera mirror housing 120 then protrudes outwards of the panel 300.

FIG. 6B shows a view illustrating a state in which the camera mirror assembly 100 begins to protrude outwards of the panel 300 under the condition that the cover 310 of the panel 300 has been preferentially opened.

As illustrated in FIG. 6B, the pinion gear 320 is rotated by the rack gear 230, and as such, the cover 310 of the panel 300 integrally coupled to the pinion gear 320 is rotated. As a result, the cover 310 is opened while moving to the inside of the panel 300.

In a preferred embodiment of the present invention, the cover 310 integrally coupled to the pinion gear 320 is moved to the inside of the panel 300 by a predetermined depth in accordance with initial driving of the rack gear 230, and is then rotated at the inside of the panel 300 to open the opening of the panel 300. Thus, the cover 310 of the panel 300 may be configured to rotate at the inside of the vehicle without interfering with the panel 300.

When the driving gear 210 rotates counterclockwise, the central shaft of the rotating gear 220 is also rotated in the counterclockwise direction while moving along the guide 240 disposed at the housing of the driving unit 200.

Further, the protrusion 221 provided at the central shaft of the rotating gear 220 is inserted into the guide 240 such that the protrusion 221 moves along the guide 240. Accordingly, the rotating gear 220 is guided to move along the circumferential surface of the driving gear 210.

In accordance with movement of the rotating gear 220, at least a portion of the camera mirror assembly 100 protrudes outwards of the panel 300.

Figure 6C:
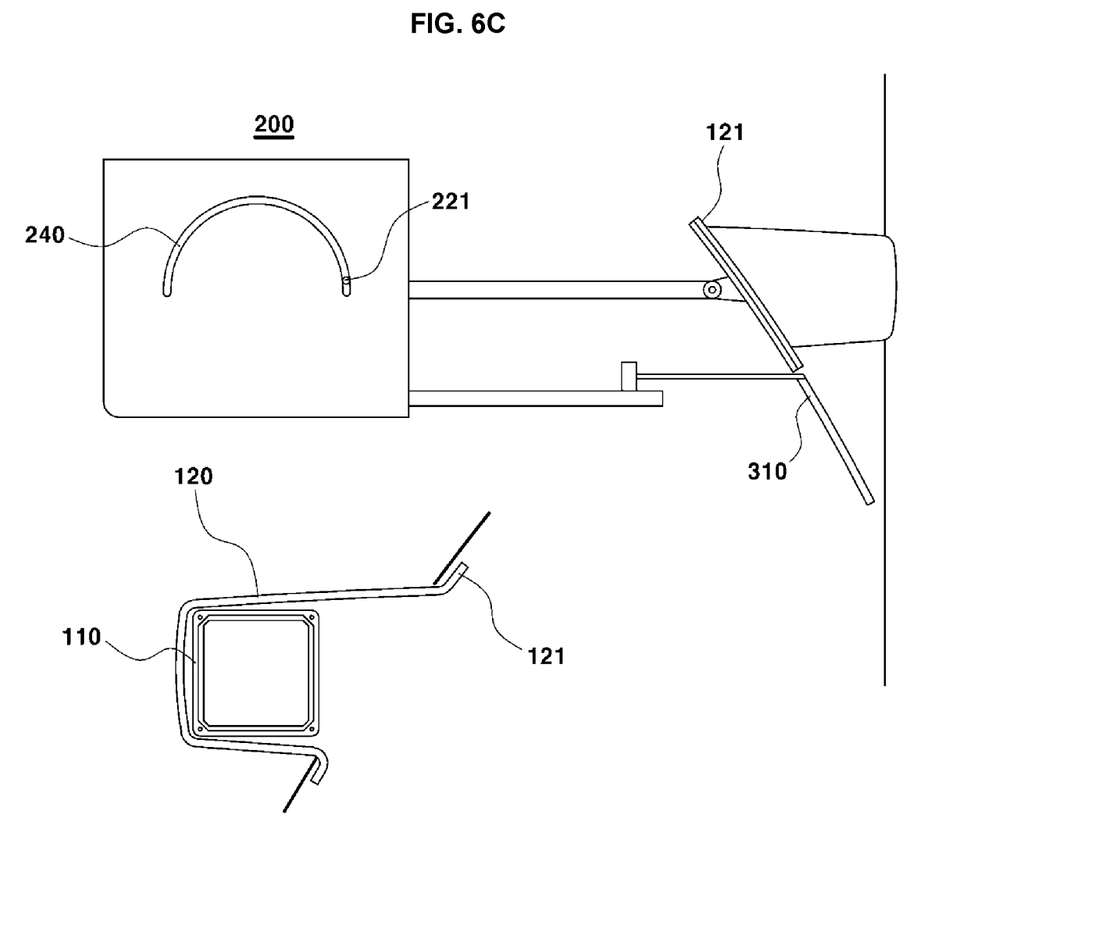
FIG. 6C is a view illustrating a state in which the camera mirror assembly protrudes to the outside of the vehicle, and the cover is opened in the pop-up apparatus according to the illustrated embodiment of the present invention.

FIG. 6C shows a view illustrating a state in which the camera mirror assembly 100 protrudes outwards of the panel 300. A stopper 121 may be provided at one end of the camera mirror housing 120 to limit the maximum protrusion amount of the camera mirror assembly 100 protruding outwards of the panel 300.

In a preferred embodiment of the present invention, the stopper 121, which limits the maximum protrusion amount of the camera mirror assembly 100, is configured to face the inner surface of the panel 300. In this case, even when the camera mirror assembly 100 protrudes by a maximum amount, at least a portion of the camera mirror housing 120 is still disposed inside the panel 300.

Figure 7:
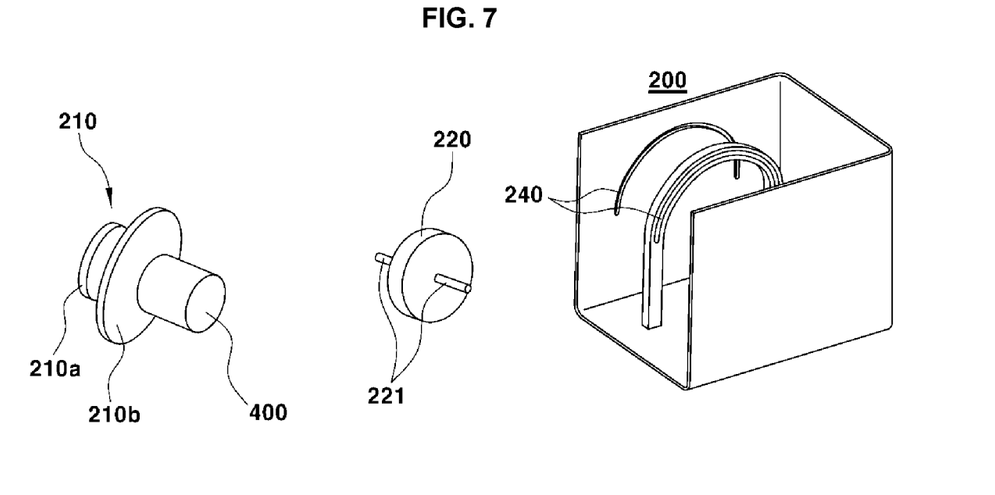
FIG. 7 is a view illustrating the driving unit in the pop-up apparatus according to the illustrated embodiment of the present invention.

FIG. 7 illustrates a configuration of the driving unit 200. FIG. 7 depicts the driving gear 210, which includes a plurality of plates; the rotating gear 220, which moves along the outer circumferential surface of the driving gear 210 while rotating; and the housing of the driving unit 200, which accommodates the driving gear 210, the rotating gear 220 and the rack gear 230.

In the illustrated embodiment of the present invention, the driving unit 200 includes the driving gear 210, the rotating gear 220 and the rack gear 230. These gears are disposed within the housing of the driving unit 200.

The driving gear 210, which is constituted by two plates, is disposed within the housing of the driving unit 200. The rotating gear 220 is configured to move along the outer circumferential surface of the first driving plate 210a while rotating. The rotating gear 220 is also configured to move along at least one guide 240 disposed within the housing of the driving unit 200.

In a preferred embodiment of the present invention, the housing of the driving unit 200 may be configured to include two guides 240 disposed at opposite sides of the first driving plate 210a. In this case, the rotating gear 220 may include protrusions 221 extending from opposite ends of the central shaft of the rotating gear 220 to be inserted into the guides 240, respectively.

The rack gear 230 is disposed beneath the second driving plate 210b to be engaged with the second driving plate 210b. The rack gear 230 is also selectively engageable with a gear mounted to the rear surface of the cover 310. The rack gear 230 converts a rotating force of the driving gear 210 into a horizontal movement force.

In accordance with the above-described configuration, the rack gear 230 is configured to move in a horizontal direction parallel to the width direction of the vehicle. The rack gear 230 is selectively engageable with the pinion gear 320 disposed at the rear surface of the cover 310 to apply a rotating force to the cover 310.

In a preferred embodiment of the present invention, the rack gear 230 is configured to preferentially rotate the cover 310, and the rotating gear 220 then moves to protrude the camera mirror assembly 100 to the outside of the panel 300. In this case, a driving relationship between the rotating gear 220 and the rack gear 230 may be set such that horizontal movement of the camera mirror assembly 100 is carried out after the opening of the panel 300 is opened.

In an embodiment of the present invention, the gear ratio of the driving gear 210 may be set such that the time taken for the camera mirror assembly 100 to move in accordance with movement of the rotating gear 220 along the outer circumferential surface of the driving gear 210 until the camera mirror assembly 100 faces the inner surface of the panel 300 is longer than the time taken for the rack gear 230 to move horizontally by the driving gear 210 until the rack gear 230 rotates the pinion gear 320, and as such, the camera mirror assembly 100 begins to protrude to the outside of the vehicle after the opening is opened.

Thus, the pop-up apparatus for the camera mirror system disposed inside the panel 300 of the vehicle body may enable horizontal movement of the camera mirror assembly 100 without interference between the camera mirror assembly 100 and the panel 300.

The present invention may provide the following effects in accordance with the illustrated embodiments, the above-described configurations, the combinations of the configurations, and use relations thereof.

The present invention may provide a pop-up apparatus for a camera mirror system enabling the camera mirror system to be disposed inside a panel of a vehicle body in accordance with a driving environment of a vehicle. Thus, it may be possible to provide a camera mirror system safe against an external environment of a vehicle.

In addition, the present invention may provide a camera mirror system disposed at an area adjacent to a fender of a vehicle, thereby being capable of providing a wider rear view.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A pop-up apparatus for a camera mirror system disposed inside a panel of a body of a vehicle, the pop-up apparatus comprising:
   a camera mirror assembly comprising:
      the camera mirror system, which provides a rear view of a vehicle,
      a camera mirror housing disposed to enclose the camera mirror system and configured to move to an outside of the panel, and
      a camera mirror frame configured to receive a driving force from a driving unit; and
   the driving unit, which opens a cover of the panel while driving the camera mirror assembly to move to the outside of the panel through an opened portion of the panel in linkage with the camera mirror frame,
   wherein the driving unit comprises:
      a driving gear configured to receive the driving force from a driver;
      a rotating gear, connected to one end of the camera mirror frame, configured to rotate along an outer circumferential surface of the driving gear; and
      a rack gear configured to be engaged at a first end thereof with the driving gear such that the rack gear is movable in a width direction of the vehicle, the rack gear being operatively connectable at a second end thereof to the cover of the panel, and
   wherein the driving unit further comprises a pinion gear connected to the cover at an inside of the cover, the pinion gear being engageable with the rack gear to rotate the cover at an inside of the panel in linkage with the rack gear.

2. The pop-up apparatus for the camera mirror system according to claim 1, wherein:
   the driving gear has a fixed central axis, and the rotating gear is engaged with the driving gear such that the rotating gear rotates along the outer circumferential surface of the driving gear; and
   the camera mirror assembly protrudes to the outside of the panel when the rotating gear is disposed at a position on the driving gear near the panel.

3. The pop-up apparatus for the camera mirror system according to claim 1, wherein:
   the driving gear has a fixed central axis, and the rotating gear is engaged with the driving gear such that the rotating gear rotates along the outer circumferential surface of the driving gear; and
   the camera mirror assembly is retracted into the inside of the panel when the rotating gear is disposed at a position on the driving gear far from the panel.

4. The pop-up apparatus for the camera mirror system according to claim 1, further comprising:
   a stopper disposed at at least one end of the camera mirror housing to be engaged with an inner surface of the panel when the camera mirror assembly protrudes to the outside of the panel.

5. The pop-up apparatus for the camera mirror system according to claim 1, further comprising:
   a driving unit housing configured to enclose the driving unit.

6. The pop-up apparatus for the camera mirror system according to claim 5, wherein the rotating gear is provided with a protrusion configured to move along a guide provided at the driving unit housing.

7. The pop-up apparatus for the camera mirror system according to claim 1, wherein the driving gear comprises two gear plates respectively configured to be engageable with the pinion gear and the rotating gear.

8. The pop-up apparatus for the camera mirror system according to claim 1, wherein the camera mirror frame is fixed to a central shaft of the rotating gear, to move the camera mirror assembly in a longitudinal direction of the camera mirror frame.

* * * * *